Sept. 28, 1943.　　　D. H. HARRIS　　　2,330,578
HARDNESS TESTING MACHINE
Filed Feb. 21, 1940　　　4 Sheets-Sheet 1

INVENTOR
David H. Harris.
BY
ATTORNEY

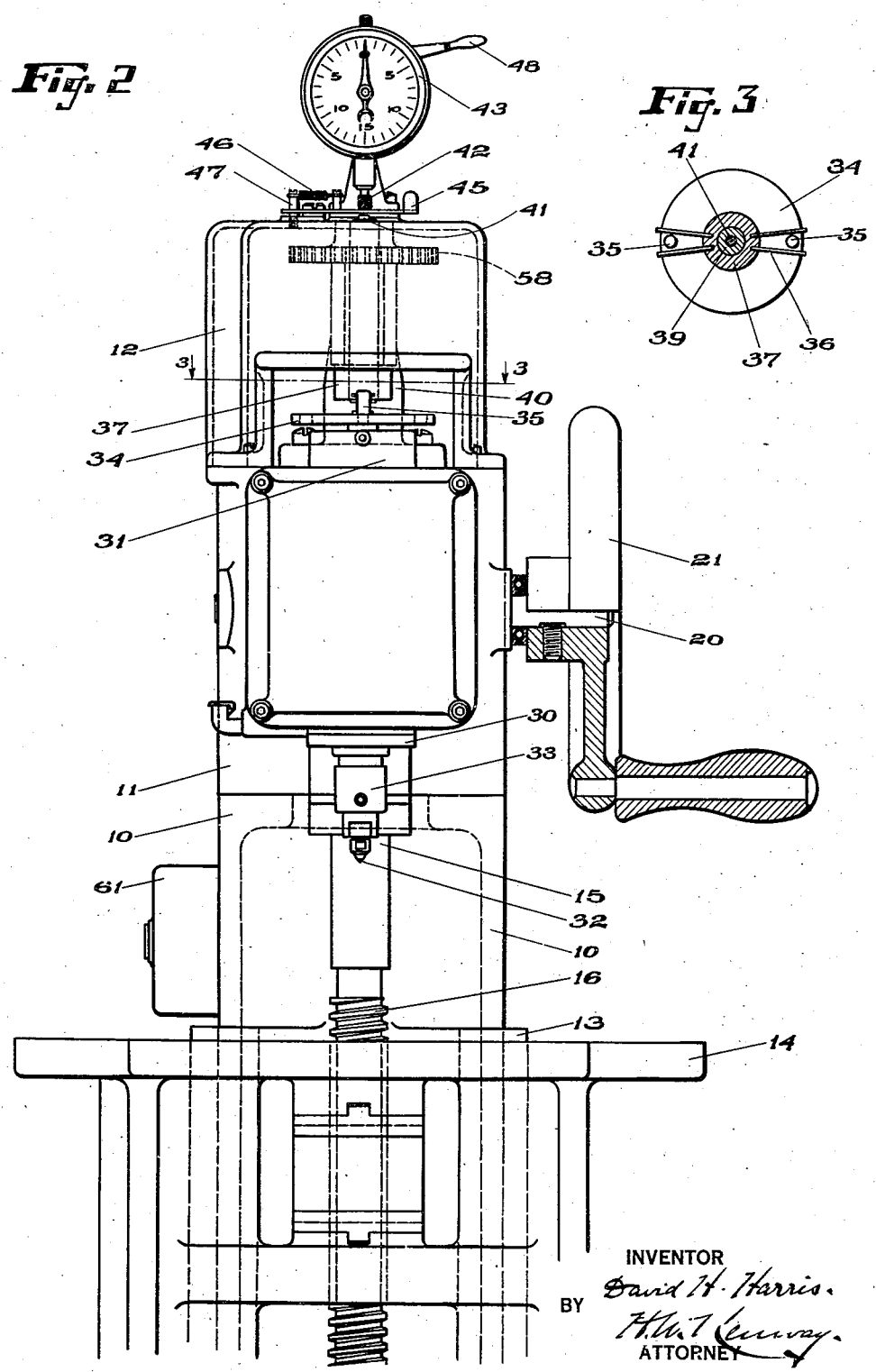

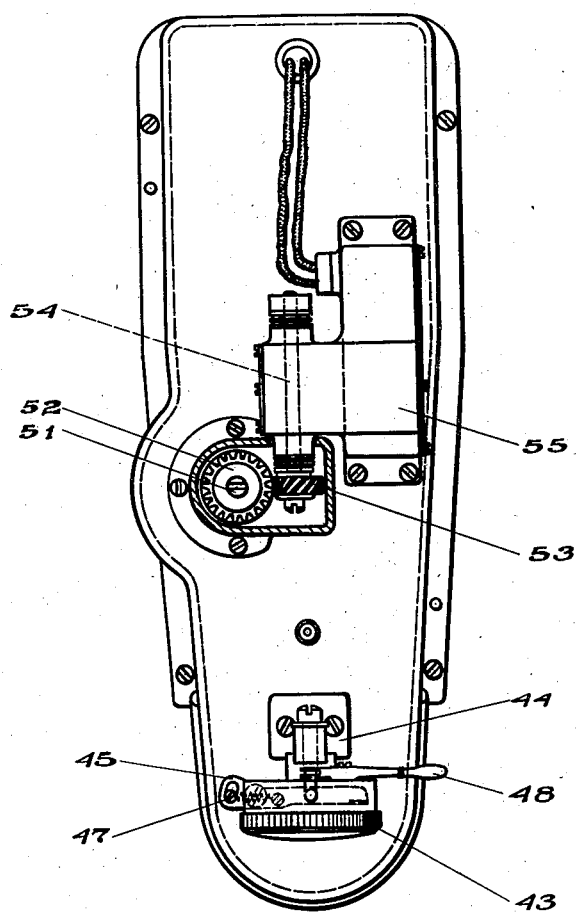

Sept. 28, 1943.   D. H. HARRIS   2,330,578
HARDNESS TESTING MACHINE
Filed Feb. 21, 1940   4 Sheets-Sheet 4

INVENTOR
David H. Harris.
BY
ATTORNEY

Patented Sept. 28, 1943

2,330,578

UNITED STATES PATENT OFFICE 2,330,578

HARDNESS TESTING MACHINE

David H. Harris, Brookline, Mass., assignor to Gillette Safety Razor Company, Boston, Mass., a corporation of Delaware Application February 21, 1940, Serial No. 320,075

12 Claims. (Cl. 265—12)

This invention relates to machines for testing the hardness of materials and while it has a broader application, its most important field of use is in the testing of abrasive wheels, ceramic products in general, artificial stone, cement and the like. For purposes of illustration the invention will be discussed in its adaptation to that field.

Large quantities of abrasive wheels are used throughout the grinding industry today—wheels made from a variety of types and sizes of abrasives and using many different bonding materials. Every user is interested in the problem of determining, first, the type of wheel that is best adapted for the work in hand and second, of insuring duplication of the type of wheel selected. The user is confronted with a number of variable factors which make a decision extremely difficult. The problems of lubrication, cutting speed, pressure, operator attention, grit, size, hardness, porosity, bond, etc., all bear upon performance and it is, therefore, very desirable to fix as closely as possible those factors of performance which are capable of being determined with accuracy. Wheel hardness is perhaps the most useful characteristic to determine and control.

The principal object of the present invention is to provide a hardness testing machine organized and constructed to measure the physical properties of each wheel in a reliable, repeatable manner so that the grinding wheels may be accurately graded and tested before use, thus providing the wheel manufacturer with the important means for classifying and standardizing his product and supplying the user with reliable means for checking the grinding wheels before use so that he may insure duplication of conditions that have proved satisfactory and discard grinding wheels that do not conform to the desired standard.

With these objects in view an important feature of the invention consists in a hardness testing machine employing in its structure a controlled, rotatable and loaded drilling tool in combination with means for measuring and indicating the depth of penetration of the tool into the work being tested. The shape of the drilling tool is of secondary importance and may be varied to suit the requirements of the work in hand. A chisel or pyramidal drill point has proved to be entirely satisfactory and has the advantage that it may be ground with extreme accuracy and accurately centered. The drilling tool may advantageously and as herein shown be part of a rotary assembly of predetermined fixed weight and thus is arranged to rest upon the work always with a predetermined pressure. Provision is made for imparting to the drilling tool a predetermined number of rotations and for measuring the depth of penetration into the work and for accurately indicating the extent of penetration. For example, the rotary drill assembly may weigh approximately three pounds and may have fifteen rotations imparted thereto in investigating a fine grinding resinous grinding wheel. The load may be increased for testing wheels of greater bond strength or the number of rotations may be varied in order to secure a convenient range of scale reading.

While the machine of my invention is not limited to any special construction for loading the drilling tool, one convenient and desirable arrangement consists in providing a static weight by mounting upon the spindle of the drilling tool an easily rotatable weight, preferably by ball-bearings. The result is that the drilling tool is pressed against the work always with the predetermined pressure and that on account of the ball-bearing connection little or no momentum is transmitted from the weight to the drilling tool.

Another feature of the invention consists in driving means which are effective to rotate the drilling tool without imparting downward pressure thereto and which are effective to absorb shocks that might otherwise be transmitted to it and result in irregular operation. As herein shown the spindle of the drilling tool is provided with a disk carrying upstanding studs upon its face which are engaged by arms of piano wire or the like and which project radially from a suitable driving element. Sliding friction is thus reduced to a minimum and shocks which would otherwise be imparted to the spindle are absorbed by the flexibility of the piano wire arms.

Preferably and as herein shown the spindle of the drill is connected through a positively acting train of mechanism to the movable indicator of a gauge constructed and arranged to measure and indicate the penetrating movement of the drilling tool during its predetermined rotation. At an intermediate point in this indicating train a rotary driving train is brought into play. One satisfactory construction is that in which the indicating train comprises axially moving members transmitting directly the longitudinal movement of the drilling tool to the gauge, and in which rotary movement is transmitted to a sleeve or hollow shaft concentrically disposed with respect to one of the axially moving members and operatively connected to the drilling tool.

These and other features of the invention will be best understood and appreciated from the following description of a preferred embodiment thereof, selected for purposes of illustration and shown in the accompanying drawings, in which:

Fig. 2 is a corresponding view in front elevation;

Fig. 3 is a sectional view on line 3—3 of Fig. 2;

Fig. 4 is a plan view of the machine with certain parts shown in section; and

Figure 1:
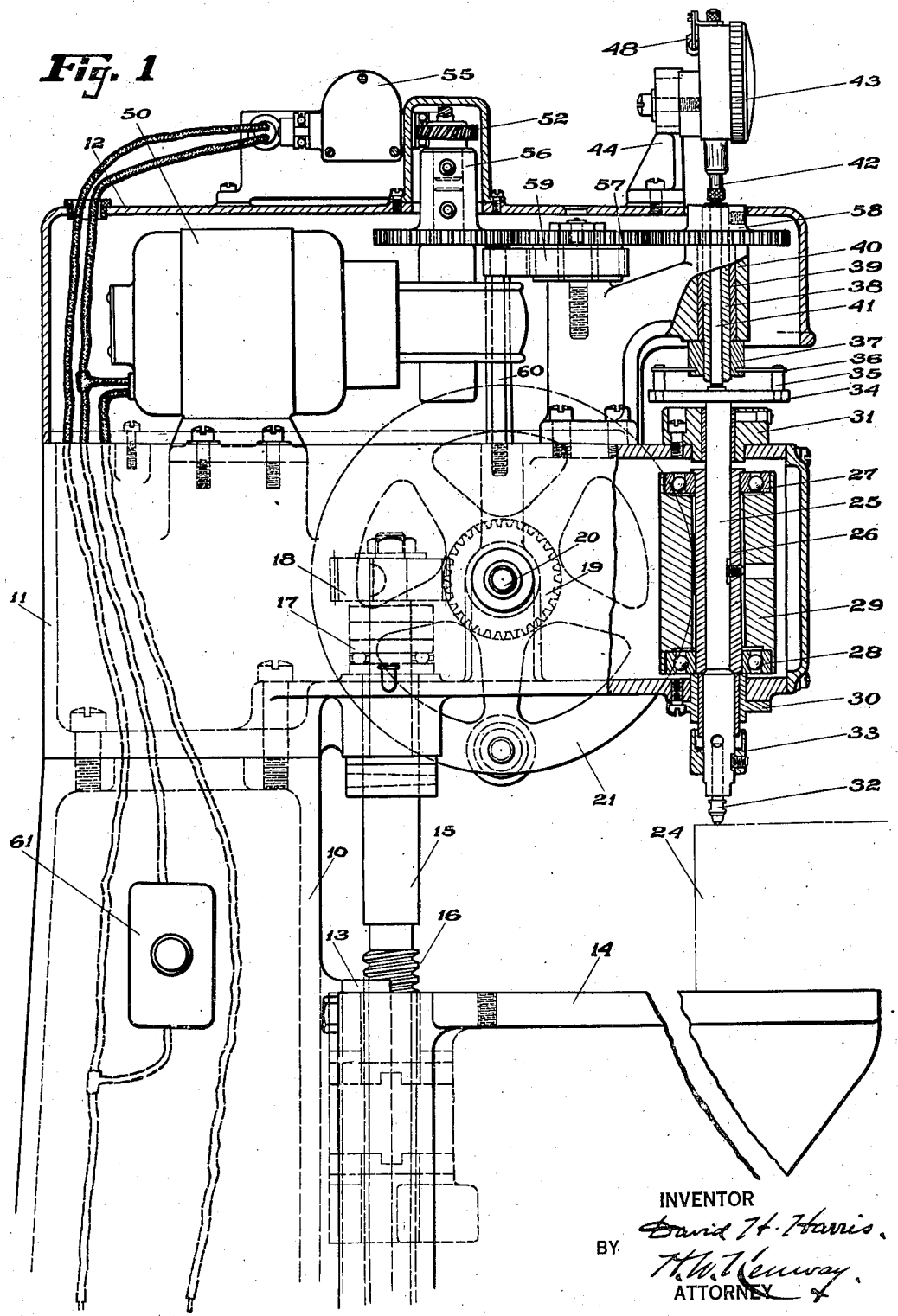
Fig. 1 is a view of the machine in side elevation partly in longitudinal section.
Figure 5:
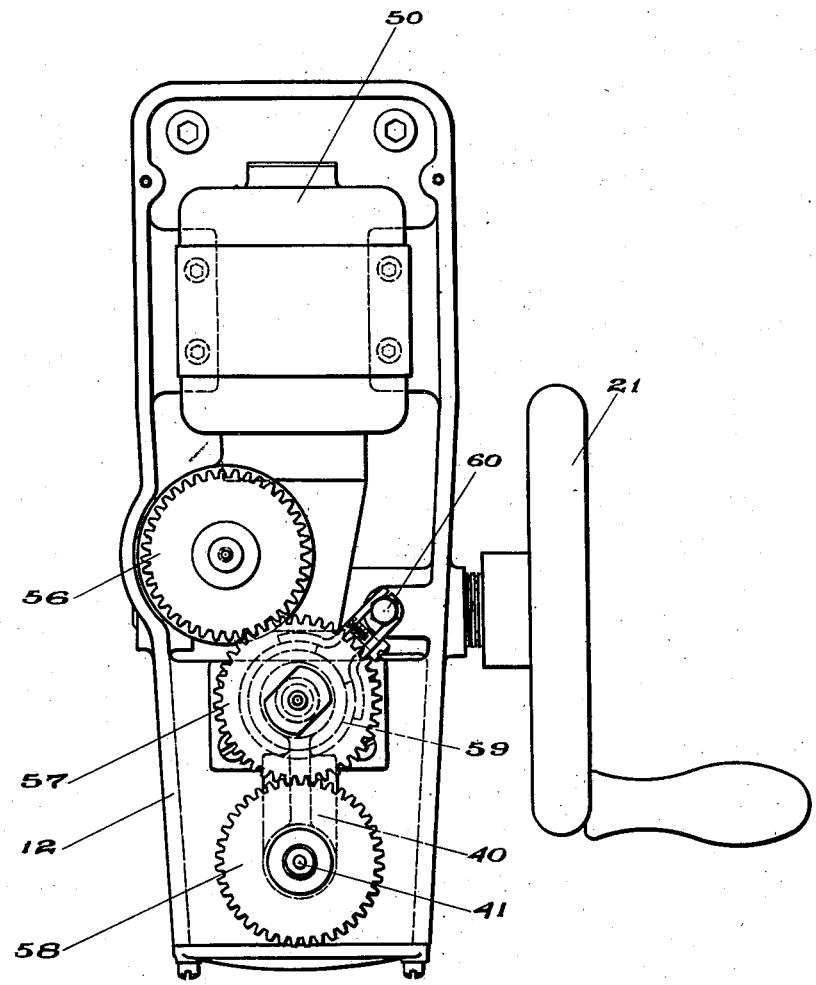
Fig. 5 is a plan view of the machine as seen from above with its upper housing removed.

The machine comprises an upright column or standard 10 to which is bolted an overhanging head casting 11 and this in turn is surmounted by a removable housing 12 enclosing the upper portion of the machine and itself carrying an indicator and rotation controlling mechanism. The column 10 is provided in its face with vertical ways 13 upon which slides a projecting work table 14. The work table is suspended from the head casting 11 upon a vertical shaft 15 having a lead screw 16 formed therein which is engaged with an internal thread formed in the body of the work table. Ball thrust bearings 17 carried by the head casting 11 support the shaft 15 and the latter is provided at its upper end with a pinion 18. The pinion 18 meshes with a worm gear 19 fast on a transverse shaft 20 which is journalled in the sides of the head casting 11 and provided at its outer end with a hand wheel 21. The hand wheel is located within convenient reach of the operator and by turning it the work table 14 may be raised or lowered to bring the work and the drilling tool into the desired initial position for the testing operation. An abrasive wheel 24 is indicated in dot-and-dash lines as lying on one of its side faces upon the work table 14 in such position that its upper face is positioned beneath the drilling tool at a point near the circumference of the wheel.

The head casting 11 is hollow and shaped to enclose a self-contained spindle unit and to that end carries upper and lower stationary flanged bushings 30 and 31 in which is journalled a vertical tool carrying spindle 25. The spindle is shouldered at its lower end and secured by a set screw to a sleeve or bushing 26 which carries the inner race of upper ball-bearings 27 and lower ball-bearings 28. The outer races of these two bearings are carried by an elongated cylindrical weight 29 which is disposed concentrically with respect to the spindle 25 and arranged to spin freely upon it, or to have the spindle 25 spin freely within it. The spindle 25, with its bushing 26 and the weight 29, is a self-contained unit and is freely movable vertically as a unit in the bearings 30 and 31 to a limited extent, this being indicated by clearance shown in Fig. 1 between the upper end of the bushing 26 and the lower end of the stationary bushing or bearing 31.

At its lower end the spindle 25 is provided with an axial bore or socket for the reception of the drilling tool 32 and above the drilling tool is provided a sleeve or collar 33 which fits concentrically upon the lower end of the bushing 26 and telescopes upon the same when the spindle is lifted.

At its upper end the spindle 25 is provided with a driving disk 34 carrying at diametrically opposite points a pair of upstanding studs 35 as best shown in Figs. 1 and 3. The driving torque is transmitted to the studs 35 by piano wire arms 36 which project outwardly from a collar 37 fast upon the lower end of a hollow vertical shaft 38 which is surrounded by a bushing 39 journalled in a bracket 40 secured to the top of the head casting 11 and extending upwardly therefrom and in overhanging relation. Within the hollow shaft 38 is concentrically mounted a solid pin or rod 41 which rests at its lower end upon the upper end of the spindle 25 and engages at its upper end with the plunger 42 of an indicator or gauge 43.

The gauge 43 is provided with a disk face graduated directly in thousandths of an inch and reading both ways from the zero point. It is supported upon a bracket 44 bolted to the top face of the housing 12 and operated by the vertical movement of the plunger 42 already mentioned. An elongated guard plate 45, shown in Fig. 4, is pivotally mounted upon the top of the housing in position to be swung horizontally beneath the plunger 42 and hold it out of action when the machine is not in use. The guard plate is transversely slotted at its left end as shown in Figs. 2 and 4 and provided with an angular finger piece at its right-hand end. A stop pin 47 stands in the slot and a spring 46 connects a pin on the guard plate with the stop pin 47 in a line which passes across the axis of movement of the guard plate when the latter is swung from operative to inoperative position. The spring accordingly tends to hold the guard plate either in operative position as shown in Figs. 2 and 4, wherein it is aligned with the plunger 42, or in an inoperative position where it is out of line with the plunger so that the plunger may make direct contact with the pin 41 which rests on the spindle 25. The gauge is also provided with a setting handle 48 by which the pointer thereof may be set at zero for any predetermined initial position of the plunger 42.

The machine herein shown is motor-driven and to this end a motor 50 is mounted within the housing 12 and operatively connected with an automatic stop mechanism 55 including a timing switch or revolution counter and being mounted on top of the housing 12. The motor has an enclosed worm drive to a vertical shaft 51 carrying at its upper end a worm gear 52. The worm gear 52 in turn meshes with the worm 53 carried by the end of a horizontal shaft 54 constituting a part of the automatic stop mechanism 55. The details of this mechanism are not herein shown since in their specific form they constitute no part of the invention but may be of any well-known or commercial construction organized to throw an electric switch and cut off the supply of energy to the motor after the latter has made a predetermined number of revolutions as measured through the two worm gear reductions which are interposed in the gear train between the motor and the automatic stop mechanism.

The shaft 51 carries within the housing 12 a gear 56 arranged to mesh with an intermediate pinion 57 which in turn meshes with the pinion 58 secured to the hollow shaft 38. A friction brake 59 is provided about the hub of the pinion 57 and this is supported at the upper end of a standard 60 threaded into the head casting of the machine. The brake may be adjusted so that overthrow of the driving gear train between the motor and the shaft 38 is practically eliminated. The machine is further provided with a starting and stopping switch 61 which as herein shown is conveniently located on the left-hand side of the column 10.

It will be noted that the spindle 25, pin 41 and plunger 42 constitute a train of axially movable members transmitting vertical movement of the drilling tool 32 to the gauge 43, or permitting the gauge to follow up and indicate the vertical movement of the drilling tool. The gears 56, 57 and 58 and the hollow shaft 38, on the other hand, constitute a train of rotary members transmitting rotary movement to the drilling tool and effective for that purpose at an intermediate point in the indicating train 25, 41, 42, viz: at the upper end of the spindle 25. Here the connection is made through the flexible arms 36 and the upstanding studs 35 above described.

The operation of the machine will be apparent from the foregoing description but may be briefly summarized as follows:

A grinding wheel or other object to be tested is first placed upon the work support and the hand wheel 21 is rotated to lift the work until it is brought into contact with the drilling tool 32 and then further until the weighted spindle assembly is lifted in its bearings 30 and 31. The drilling tool now rests upon the work by the gravity pressure of the supported parts including the weight 29. The guard plate 45 is now swung into its inoperative position whereupon the plunger 42 is brought to rest upon the pin 41. There is thus provided a positive straight line connection from the point of the drilling tool to the plunger of the gauge 43. The setting handle 48 is now operated to bring the gauge pointer to the zero point. The automatic stop mechanism has been adjusted for the number of revolutions required and the machine is now set in operation by throwing the switch 61. The motor is immediately set in operation imparting to the pinion 58 and the drilling tool the desired and predetermined number of revolutions which, for example, may be twelve or fifteen. During these revolutions the drilling tool penetrates into the work a distance proportional to the hardness of the composition of the grinding wheel, the softer the wheel the deeper will be the penetration. This downward movement of the drilling tool is accurately measured and directly indicated by the pointer of the gauge 43. When the required number of revolutions have taken place the automatic stop mechanism 55 is tripped and the motor circuit interrupted, thus bringing the spindle and drill immediately to a stop. The automatic stop may now be reset and the testing operation repeated upon other parts of the grinding wheel under investigation; in each case the degree of hardness being measured and indicated by the gauge 43 in terms easily read and comprehended by the user.

Each time the work table 14 is lowered the spindle mechanism drops of its own weight until supported by the lower bushing 30 and each time the work table is elevated the spindle mechanism is moved upwardly to clear the head casting. During the rotation of the spindle 25 the weight 29 may or may not rotate. Usually it acquires through the slight friction of the bearings a slow angular movement and when the spindle rotation is abruptly stopped at the completion of the pre-determined number of its revolutions the momentum of the weight is dissipated in a continued spinning movement which has a negligible effect upon the spindle. While friction between the piano wire arms 36 and the studs 35 may tend to retard the downward movement of the drilling tool assembly this friction is also so slight as to be negligible and in any case it is a constant of the machine which appears uniformly in all its readings.

It will be noted that the brake 59 acts directly upon the idle gear 57 of the rotary driving train with the result that its braking effect is at once transmitted to the hollow shaft 38 when the actuating current is cut off from the motor at the conclusion of the predetermined number of revolutions allowed to it by the automatic timing mechanism 55. The rotation of the drilling tool is thus abruptly and accurately stopped at the same point in successive testing cycles.

While the illustrated machine is organized to measure the depth of penetration resulting from a predetermined number of revolutions of the drilling tool, it will be apparent that with suitable modification the machine could be equally well organized to measure the number of revolutions of the drilling tool required to penetrate the work to a predetermined depth. In the latter case the hardness of the sample would be expressed in terms of revolutions instead of inches.

The construction herein disclosed in which a weight is carried directly by the drilling spindle is the most satisfactory now known to me, but if more convenient for testing large samples, the weight may be located at a more remote point and connected by suitable links or levers to the drilling tool.

Having thus disclosed by invention and described one illustrative embodiment thereof, but not in any limiting sense, I claim as new and desire to secure by Letters Patent:

1. A hardness testing machine having a drilling spindle, a rotary driving member and a depth indicator all located in vertical alignment and operatively connected, manually controlled means movable transversely for interrupting the connection between the drilling spindle and the depth indicator, and a work support located beneath the drilling spindle.

2. In a hardness testing machine, a work support and a depth indicator mounted in spaced relation, a drilling tool and spindle movable between the two, an axially movable rod mounted in alignment with said spindle and resting thereon and operatively connected to the indicator, a driving sleeve arranged concentrically and rotatably upon said rod, and mechanical driving means for connecting said spindle and driving sleeve while leaving said spindle and rod free for limited longitudinal movement.

3. A hardness testing machine comprising a frame, a work-support, a self-contained spindle unit including a spindle journalled for rotation in the frame, carrying a cutting tool and arranged to rest by gravity on the work, ball-bearings carried by the spindle, an elongated cylindrical weight concentrically enclosing a substantial portion of the spindle and carried for free rotation thereon by the ball-bearings, and means for imparting rotation to the spindle independently of said weight.

4. A hardness testing machine comprising a frame, a work support, a self-contained spindle unit including a spindle journalled for rotation about a vertical axis in the frame, a cutting tool carried by the spindle at its lower end, a sleeve fast to the spindle, a cylindrical weight surrounding said sleeve and freely rotatable thereon whereby the spindle may be abruptly stopped without stopping the rotation of the weight, and means for rotating the spindle while the weight is free to remain at rest.

5. A hardness testing machine comprising a frame having spaced upper and lower bearings, a vertical spindle journalled therein and provided at its lower end with a testing tool, a sleeve fast to the spindle between said spaced bearings, a concentric weight surrounding said sleeve and mounted for free rotation on said sleeve and about its axis, whereby the spindle may be abruptly stopped while the weight is still in rotation, and driving means for rotating the spindle while the weight is free to remain at rest.

6. A hardness testing machine comprising a frame having spaced overhanging branches, a vertical spindle journalled in the lower of said branches and provided at its lower end with a testing tool, a cylindrical weight mounted concentrically for free rotation about said spindle whereby the spindle may be abruptly stopped while the weight still revolves thereon, a disk carried by the spindle at its upper end, and driving means located in the upper of said frame branches and connected to said disk for rotating the spindle while the weight is free to remain at rest.

7. A hardness testing machine comprising a work support, a vertical spindle mounted above the work support for rotary and axial movement, a testing tool carried at the lower end of said spindle, means for supplying the spindle with a measured load, a spindle-driving sleeve mounted to rotate in a fixed location above the spindle, automatic starting and stopping mechanism for the sleeve, an axially movable pin concentrically mounted in said sleeve and resting on the spindle, a gauge operated by the pin, and driving connections between the sleeve and the spindle operating independently of the pin.

8. A hardness testing machine including in its structure a work support, a head overhanging said support and having spaced vertical bearings therein, a tool-carrying spindle mounted in said bearings for rotary and longitudinal movement, a sleeve secured to the spindle and fitting with clearance between the spindle bearings, ball bearings secured to the sleeve adjacent to both spindle bearings, an elongated cylindrical weight arranged to spin freely upon said bearings about the axis of the spindle and tending always to move the spindle downwardly with uniform pressure, and means acting outside the spindle bearings for rotating the spindle.

9. A hardness testing machine including in its structure a work support, a head overhanging said support and having spaced vertical bearings therein, a tool-carrying spindle mounted in said bearings for rotary and longitudinal movement, ball bearings carried by the spindle with a vertical spacing less than the spacing of the spindle bearings and between the latter, an elongated cylindrical weight mounted for free rotation on said ball bearings and movable bodily with the spindle, and means held against vertical movement for rotating the spindle.

10. A hardness testing machine including in its structure a work support, an overhanging hollow head having a pair of vertically spaced spindle bearings, a tool-carrying spindle mounted therein for rotary and limited vertical movement, a sleeve shorter than the space between said bearings fixed to said spindle and arranged to support the spindle by resting upon the lower of said bearings, ball bearings carried by said sleeve at its upper and lower ends, an elongated cylindrical weight mounted on said ball bearings for movement with the spindle vertically between the spindle bearings and for rotation independently of the sleeve about the axis of the spindle, and means for rotating the spindle while leaving the latter free to move up or down in its bearings.

11. A hardness testing machine including in its structure a work support for an abrasive wheel, a hollow head overhanging the support and having spaced spindle bearings in its upper and lower surfaces respectively, a tool-carrying spindle mounted therein for rotary and limited vertical movement, ball bearings movable with the spindle within the said head, adjacent to each of the spindle bearings, an elongated cylindrical weight mounted on said ball bearings for free rotation about the axis of the spindle and movable vertically with the said spindle, a bracket overhanging the head and having a vertically movable plunger therein which rests at its lower end on said spindle, a power-operated driving device journaled in said bracket concentrically with respect to said plunger and having operative connection with the spindle, and a gauge operated by the plunger to indicate vertical movement of said spindle.

12. In a hardness testing machine, a work support and a depth indicator mounted in spaced relation, a tool and spindle movable between the two, an axially movable rod mounted in alignment with said spindle and resting thereon and operatively connected to the indicator, a driving sleeve arranged concentrically and rotatably upon said rod, and mechanical driving means for connecting said spindle and driving sleeve while leaving said spindle and rod free for limited longitudinal movement.

DAVID H. HARRIS.